US007580552B2

United States Patent
Yoshizu et al.

(10) Patent No.: US 7,580,552 B2
(45) Date of Patent: Aug. 25, 2009

(54) IMAGE CAPTURING APPARATUS FOR PALM AUTHENTICATION

(75) Inventors: Yoshio Yoshizu, Inagi (JP); Kazumi Tone, Inagi (JP); Hiroyuki Tanaka, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 573 days.

(21) Appl. No.: 11/063,611

(22) Filed: Feb. 24, 2005

(65) Prior Publication Data
US 2005/0286744 A1 Dec. 29, 2005

(30) Foreign Application Priority Data
Jun. 28, 2004 (JP) ............... 2004-190438

(51) Int. Cl.
*G06K 9/00* (2006.01)
(52) U.S. Cl. .......... 382/115; 340/5.52; 340/5.82; 713/186
(58) Field of Classification Search ......... 382/115–127; 340/5.1, 5.2, 5.52, 5.53, 5.8–5.86; 902/3; 356/71; 713/186
See application file for complete search history.

(56) References Cited

U.S. PATENT DOCUMENTS

| | | | | |
|---|---|---|---|---|
| 4,357,597 A | * | 11/1982 | Butler | 382/115 |
| 5,526,436 A | * | 6/1996 | Sekiya | 382/115 |
| 6,404,904 B1 | | 6/2002 | Einighammer et al. | |
| 6,993,160 B2 | * | 1/2006 | Miura et al. | 382/115 |
| 7,031,502 B1 | * | 4/2006 | Mil'shtein et al. | 382/126 |
| 7,273,170 B2 | * | 9/2007 | Katsumata et al. | 235/382 |
| 2002/0048014 A1 | | 4/2002 | Kono et al. | |
| 2004/0022421 A1 | | 2/2004 | Endoh et al. | |
| 2005/0148876 A1 | | 7/2005 | Endoh et al. | |
| 2006/0038006 A1 | * | 2/2006 | Katsumata et al. | 235/380 |
| 2006/0151599 A1 | * | 7/2006 | Awatsu et al. | 235/380 |
| 2006/0193500 A1 | * | 8/2006 | Awatsu et al. | 382/115 |
| 2007/0003112 A1 | * | 1/2007 | Awatsu et al. | 382/115 |

FOREIGN PATENT DOCUMENTS

| | | |
|---|---|---|
| EP | 1 387 309 A2 | 2/2004 |
| JP | 2003-298711 A | 10/2003 |
| JP | 2004-49705 | 2/2004 |
| JP | 2004-062826 | 2/2004 |
| JP | 2004-078791 | 3/2004 |
| WO | WO 98/55003 | 12/1998 |
| WO | WO 01/25021 A1 | 4/2001 |

* cited by examiner

*Primary Examiner*—Aaron W Carter
(74) *Attorney, Agent, or Firm*—Westerman, Hattori, Daniels & Adrian, LLP.

(57) ABSTRACT

An image capturing apparatus for palm authentication captures images of a palm for use in palm authentication. In order to correctly guide the palm of a user into an image capturing region, on one side of a non-contact sensor unit for image capturing the palm, a front face guide is provided for supporting a wrist having a hand to be captured by the non-contact sensor unit. When the palm is to be captured for palm authentication, the front face guide enables guiding the palm naturally to an image capturing region of the sensor unit. Because the front face guide supports the wrist, the palm can correctly be positioned within an image capturing region of the sensor unit.

15 Claims, 14 Drawing Sheets

FIG. 20        PRIOR ART
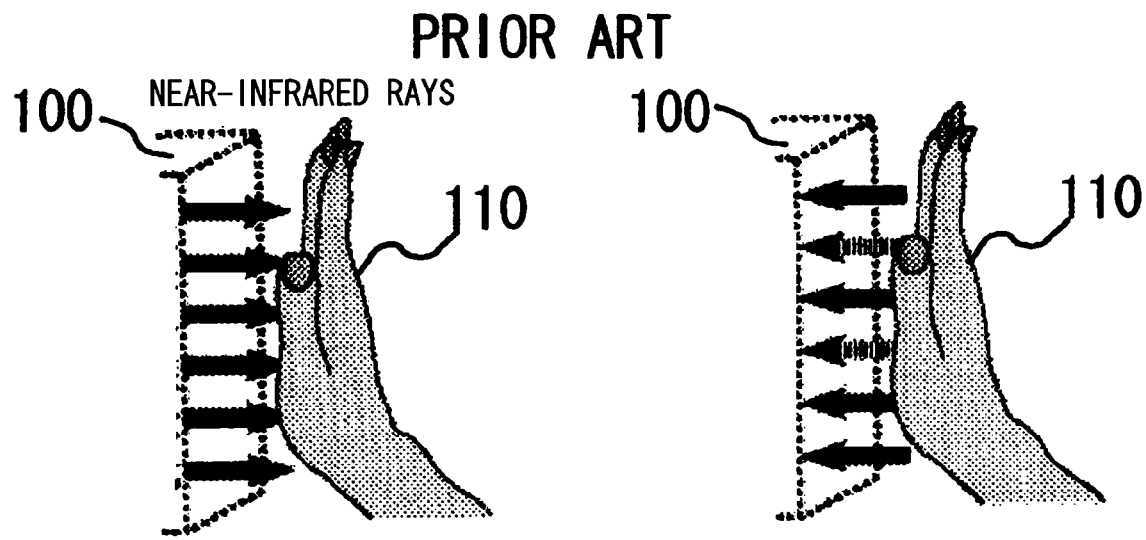
FIG. 21   PRIOR ART
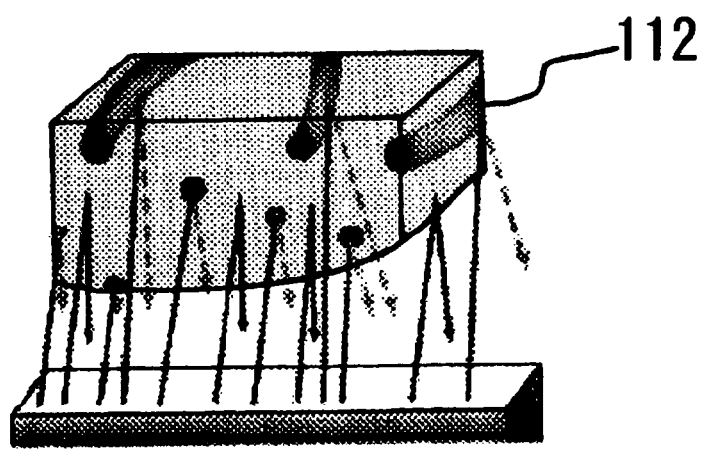

FIG. 22   PRIOR ART
REGISTERED IMAGE
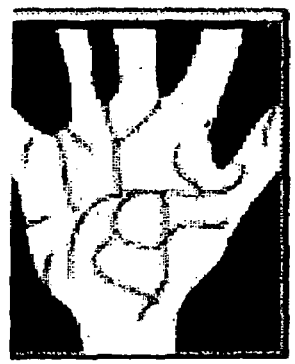
VERIFICATION IMAGE
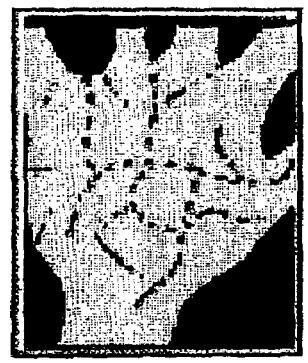
FIG. 23   PRIOR ART
REGISTERED IMAGE
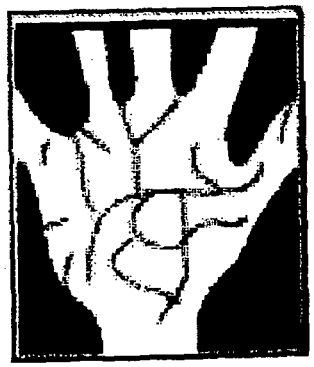
VERIFICATION IMAGE
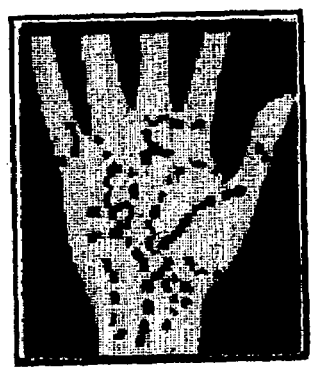

IMAGE CAPTURING APPARATUS FOR PALM AUTHENTICATION

CROSS-REFERENCE TO RELATED APPLICATIONS

This application is based upon and claims the benefit of priority from the prior Japanese Patent Application No. 2004-190438, filed on Jun. 28, 2004, the entire contents of which are incorporated herein by reference.

BACKGROUND OF THE INVENTION

1. Field of the Invention

The present invention relates to an image capturing apparatus for palm authentication for image capturing a palm, a portion of a human body for use in personal authentication, and more particularly an image capturing apparatus for palm authentication by correctly image capturing a palm even of an unaccustomed user, and easily extracting palm characteristics.

2. Description of the Related Art

There are many portions in a human body by which each person can be identified, such as fingerprint, retina, face and blood vessel. With the technological development in biometrics, a variety of apparatuses have been provided for personal authentication by recognizing the characteristics of the human body portions. Among them, the vessel of a palm or a palm pattern is suitable in view of reliability in the personal authentication, because a large amount of personal characteristics data is obtainable.

In particular, it is known that the vessel (vein) pattern in each person does not change throughout his or her life from a stage of fetus, and that no individuals in the world have an equal pattern. Accordingly, the vessel pattern can suitably be used for personal authentication. FIGS. 20 through 23 show explanation diagrams of the conventional palm authentication technique. As shown in FIG. 20, at the time of registration or authentication, a user puts a palm of his hand 110 near an image capturing apparatus 100. The image capturing apparatus 100 emits near infrared radiation to irradiate on the palm of hand 110. The image capturing apparatus 100 then receives the near infrared reflected from the palm of hand 110 using a sensor.

As shown in FIG. 21, hemoglobin in an erythrocyte flowing in a vein 112 loses oxygen. This hemoglobin (reduced hemoglobin) absorbs near infrared light having a wavelength near 760 nm. Therefore, when the near infrared is irradiated on the palm, only portions in which the veins exist produce small reflection of the near infrared, and accordingly, by detecting the strength of the reflected near infrared, the vein positions can be recognized.

A method for the personal authentication using a user's palm is disclosed in the official gazette of the Japanese Unexamined Patent Publication No. 2004-062826. According to the above disclosure, as shown in FIGS. 22 and 23, the user first registers the vein image data of his palm into a server or a card, using the image capturing apparatus 100 shown in FIG. 20. Next, to perform the personal authentication, the user makes the vein image data of his palm read in, using image capturing apparatus 100 shown in FIG. 20.

The personal authentication is carried out by collating the vein patterns between the registered vein image read out by a user's ID and the vein image read in for collation. For example, as a result of the collation of the vein pattern between the registered image and the collation image as shown in FIG. 22, the individual concerned is decided as being authenticated. Meanwhile, as a result of the collation of the vein pattern between the registered image and the collation image as shown in FIG. 23, the individual is decided as being not authenticated.

This authentication technique using the palm enables non-contact image capturing, which makes the user easy to use. However, the position, size and inclination of the image at the time of registration or collation become key issues. Namely, when the user places his palm above the image capturing apparatus, if there are differences in the posture, the distance between the image capturing apparatus and the palm, the position, the inclination or the size, a large difference may be produced for an identical palm between the registered image and the collation image, making it difficult to obtain an accurate collation.

Because the above difference becomes a factor of incorrect decision, the prior art has proposed provision of an image processing function and a sensor for guiding a palm to an image capturing range of the image capturing apparatus. However, the above disclosed guidance method is effective for users who are accustomed to such an apparatus. When the apparatus aims at unaccustomed users also, the above method is not convenient, particularly when the users want to register for the first time, or when the users have relatively little knowledge of the apparatus.

This may prevent the apparatus from ubiquitous application to come, for use in anytime, anywhere, and by anyone. Furthermore, if the operation is time-consuming, widespread use of the apparatus may be impeded from the standpoint of users and the apparatus manufacturer.

SUMMARY OF THE INVENTION

Accordingly, it is an object of the present invention to provide an image capturing apparatus for palm authentication, in which a palm is guided naturally and precisely to the image capturing range of the image capturing apparatus for the palm authentication.

It is another object of the present invention to provide an image capturing apparatus for palm authentication, in which a palm is guided naturally and precisely to the image capturing range of the image capturing apparatus, without making the user reluctant to use.

It is still another object of the present invention to provide an image capturing apparatus for palm authentication, in which a palm is guided naturally and precisely to the image capturing range of the image capturing apparatus with an improved accuracy of readout rate.

In order to achieve the aforementioned objects, an image capturing apparatus for palm authentication for image capturing an authentication pattern from a palm includes: a non-contact sensor unit which irradiates light to the palm, receives reflected light, and captures the image of the palm; and a front face guide disposed on one side of the non-contact sensor unit, for supporting a wrist with a hand to be image-captured by the non-contact sensor unit.

According to the present invention, preferably, the front face guide is disposed in such a position from the non-contact sensor unit as to support the wrist and to position the palm in an image capturing region of the non-contact sensor unit.

According to the present invention, preferably, the front face guide is disposed in such a height from the non-contact sensor unit as to support the wrist and to position the palm in a reading region of the non-contact sensor unit.

According to the present invention, preferably, the front face guide includes a wrist support portion having a portion formed along the wrist.

According to the present invention, preferably, the front face guide includes a curved wrist-support portion having a plane contact to the wrist.

According to the present invention, preferably, there is provided a rear face guide disposed on the other side of the non-contact sensor unit, for supporting fingers of the hand.

According to the present invention, preferably, the rear face guide is disposed in such a position from the non-contact sensor unit as to support the fingers of the hand and to position the palm in an image capturing region of the non-contact sensor unit.

According to the present invention, preferably, the rear face guide is disposed in such a height from the non-contact sensor unit as to support the fingers of the hand and to position the palm in an image capturing region of the non-contact sensor unit.

According to the present invention, preferably, the front face guide is a virtually L-shaped guide having an upright portion and a horizontal portion, and the horizontal portion supports the wrist.

According to the present invention, preferably, the front face guide includes a transparent member or a substantially transparent member.

According to the present invention, preferably, the non-contact sensor unit further includes a sensor unit, which irradiates near infrared light to the palm, receives reflected light from the palm, and detects a vein pattern of the palm.

According to the present invention, preferably, the non-contact sensor unit is constituted of a sensor unit having a light emitter for irradiating near infrared light to the palm, and a photodetector for receiving reflected light from the palm, whereby a reading region is determined from the performance of the light emitter and the photodetector.

According to the present invention, preferably, the rear face guide includes a transparent member or a substantially transparent member.

According to the present invention, preferably, there are provided a light emitter which is selectively driven so as to change guidance colors of the rear face guide.

According to the present invention, preferably, the rear face guide is structured to be able to rotate around an axis.

Further scopes and features of the present invention will become more apparent by the following description of the embodiments with the accompanied drawings.

BRIEF DESCRIPTION OF THE DRAWINGS

FIG. 20 shows an explanation diagram of the conventional image capturing apparatus for palm authentication.

FIG. 21 shows an explanation diagram of the principle of the conventional image capturing apparatus for palm authentication.

FIG. 22 shows an explanation diagram of the prior art of palm authentication.

FIG. 23 shows another explanation diagram of the prior art of palm authentication.

DETAILED DESCRIPTION OF THE INVENTION

The preferred embodiment of the present invention is described hereinafter referring to the charts and drawings, in order of a palm authentication system, an image capturing apparatus for palm authentication, and other embodiments.

Palm Authentication System

Figure 1:
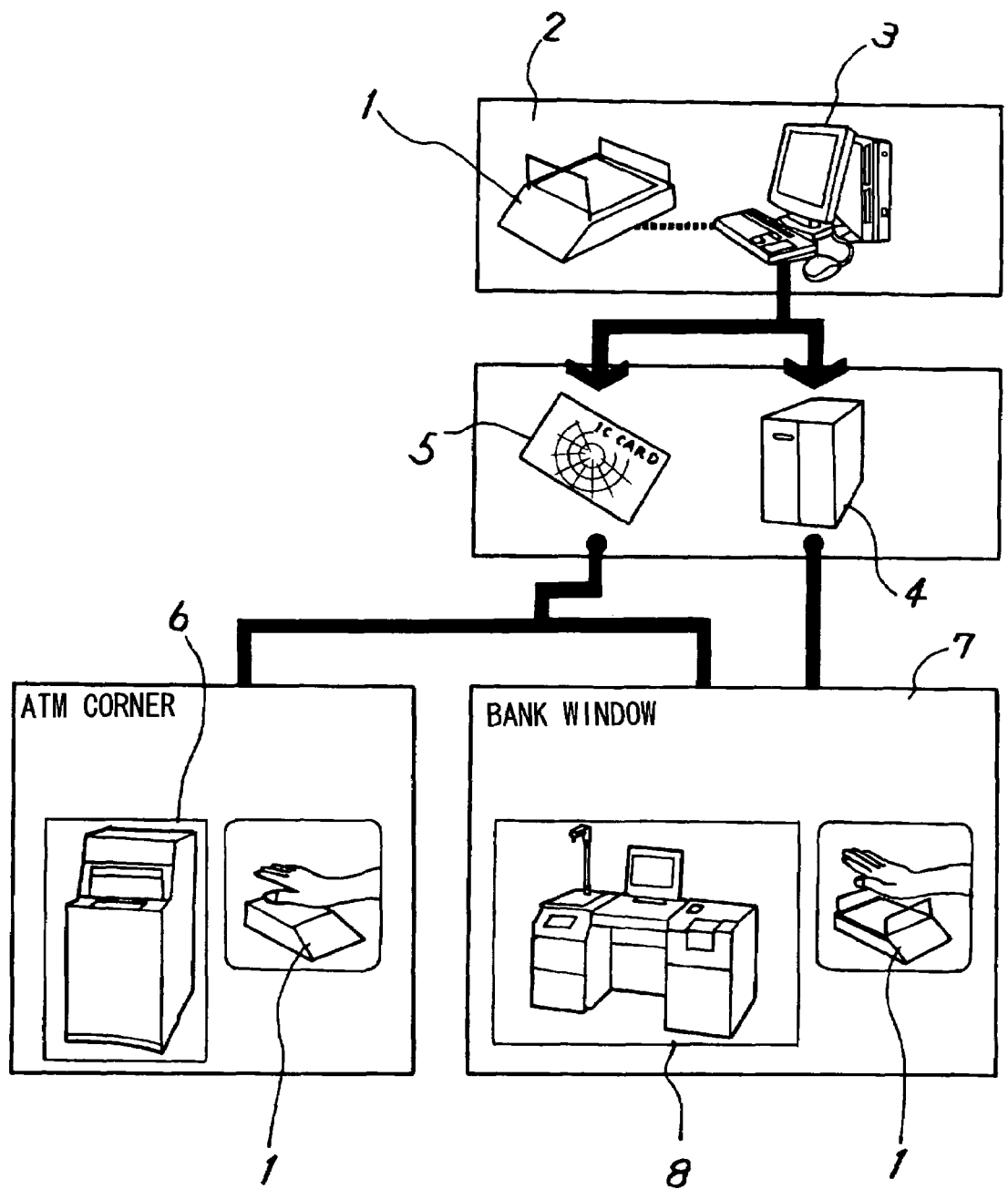
FIG. 1 shows a personal authentication system using an image capturing apparatus for palm authentication in accordance with one embodiment of the present invention.
Figure 2:
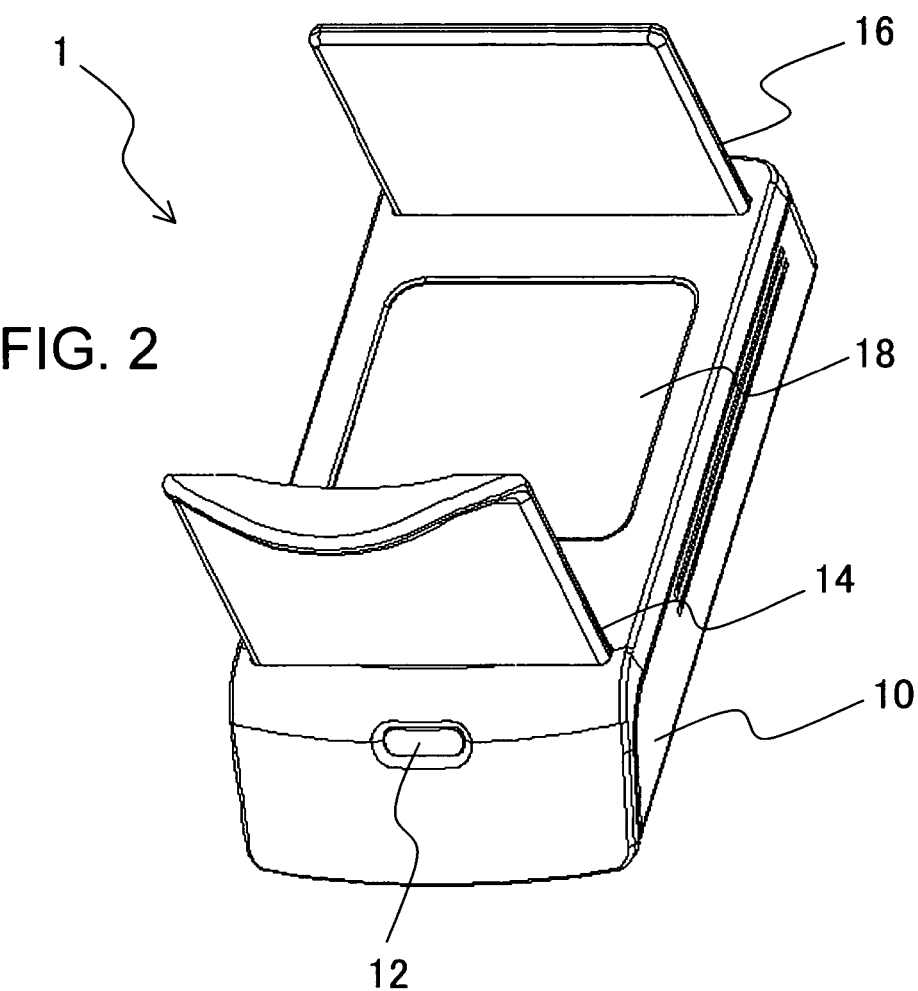
FIG. 2 shows a perspective view of the image capturing apparatus for palm authentication shown in FIG. 1.

FIG. 1 shows a personal authentication system in accordance with one embodiment of the present invention. FIG. 2 shows an outer view of the image capturing apparatus for palm authentication shown in FIG. 1.

FIG. 1 is a personal authentication system for use in a financial institution as an exemplary palm authentication system. At a window 2 in the financial institution, there are provided a palm image capturing apparatus 1, which is an object of the present invention, and a business store terminal (for example, a personal computer) 3. A user who visited the store places his palm above palm image capturing apparatus (hereafter simply referred to as image capturing apparatus) 1. The image capturing apparatus 1 reads the palm, and the vein pattern is registered on the terminal 3 side as a vein data.

The vein data is recorded in either a database server 4 connected to the terminal 3, or a personal card (for example, an IC card) 5 owned by the user. In order to perform a financial transaction such as withdrawal transaction at a window 7 of the financial institution, the user places his hand above image capturing apparatus 1 provided at the window 7. A window terminal 8 collates the vein pattern, as a vein data, with the vein data having been registered in the database server 4, and the person concerned is identified accordingly.

When the user wants a financial transaction such as withdrawal using an ATM (Automatic Teller Machine) 6 provided in the financial institution, the user places his hand above image capturing apparatus 1 provided at the ATM 6. The image capturing apparatus 1 reads the palm, and the ATM 6 collates the vein pattern of the palm, as a vein data, with the vein data having been registered in either IC card 5 or the database server 4, and the person concerned is identified accordingly.

FIG. 2 shows an outer view of the palm image capturing apparatus 1 shown in FIG. 1. As shown in FIG. 2, a main body 10 has a sensor unit 18 mounted substantially in the center. In the front portion (that is, on the user side) of the sensor unit 18, a front face guide 14 and a read confirmation lamp 12 are provided. Further, in the rear portion of sensor unit 18, a rear face guide 16 is provided.

Both the front face guide 14 and the rear face guide 16 are structured of synthetic resin plates, which are transparent or substantially transparent. As will be described later, the front face guide 14 plays the role of guiding the hand on the front face, and supporting the wrist as well. In contrast, the rear face guide 16 plays the role of supporting the fingers of the hand. Accordingly, above the sensor unit 18, the front face guide 14 and the rear face guide 16 guide the user so that the front face guide 14 supports the wrist, while the rear face guide 16 supports the fingers.

In such a way, the posture of the palm, namely the position, the inclination, and the size (height) of the palm can be uniformly arranged above the sensor unit 18, and the palm can be guided in the image capturing range.

Image Capturing Apparatus for Palm Authentication

Figure 3:
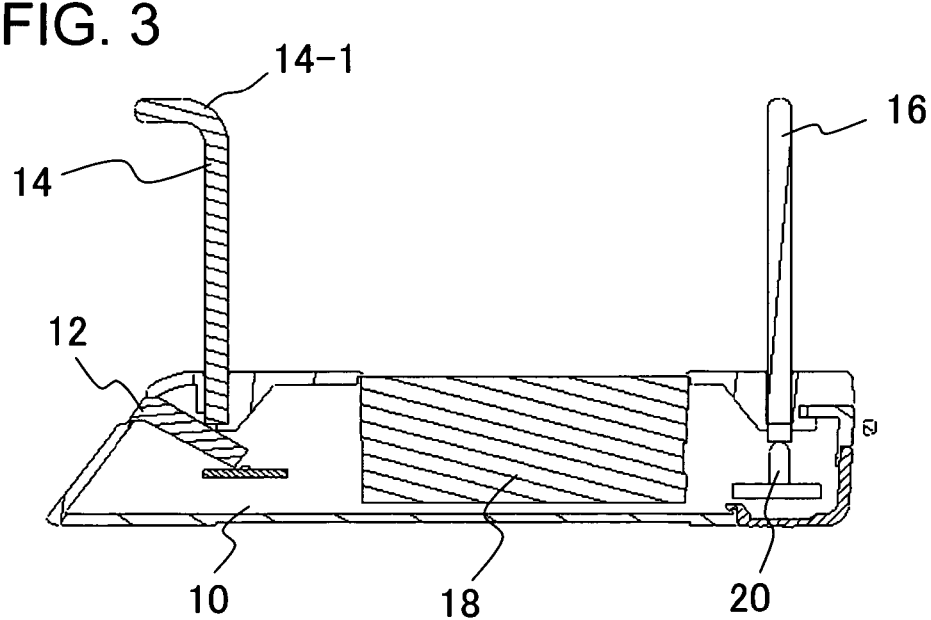
FIG. 3 shows a cross-sectional view of the image capturing apparatus for palm authentication shown in FIG. 2.
Figure 4:
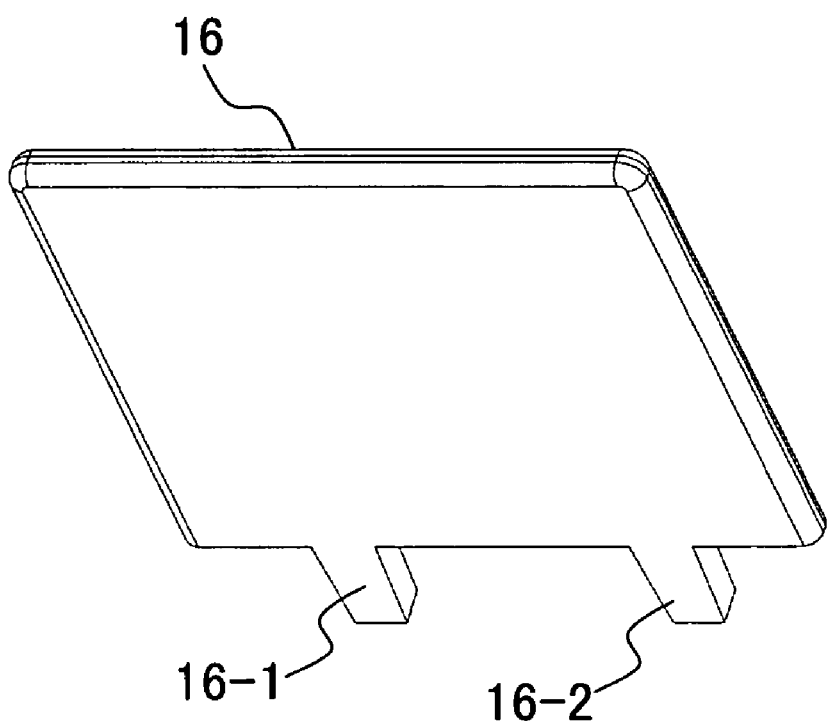
FIG. 4 shows a perspective view of a rear face guide of the image capturing apparatus shown in FIG. 3.
Figure 5:
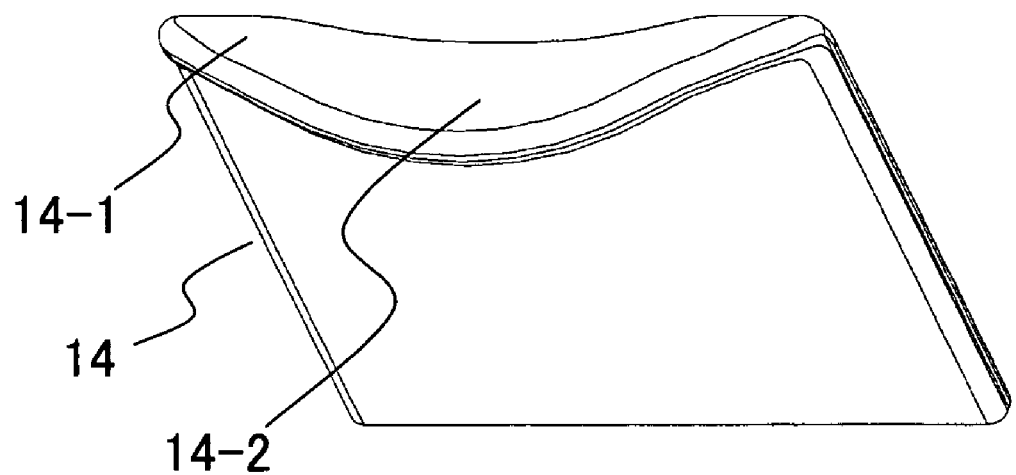
FIG. 5 shows a perspective view of a front face guide of the image capturing apparatus shown in FIG. 3.
Figure 6:
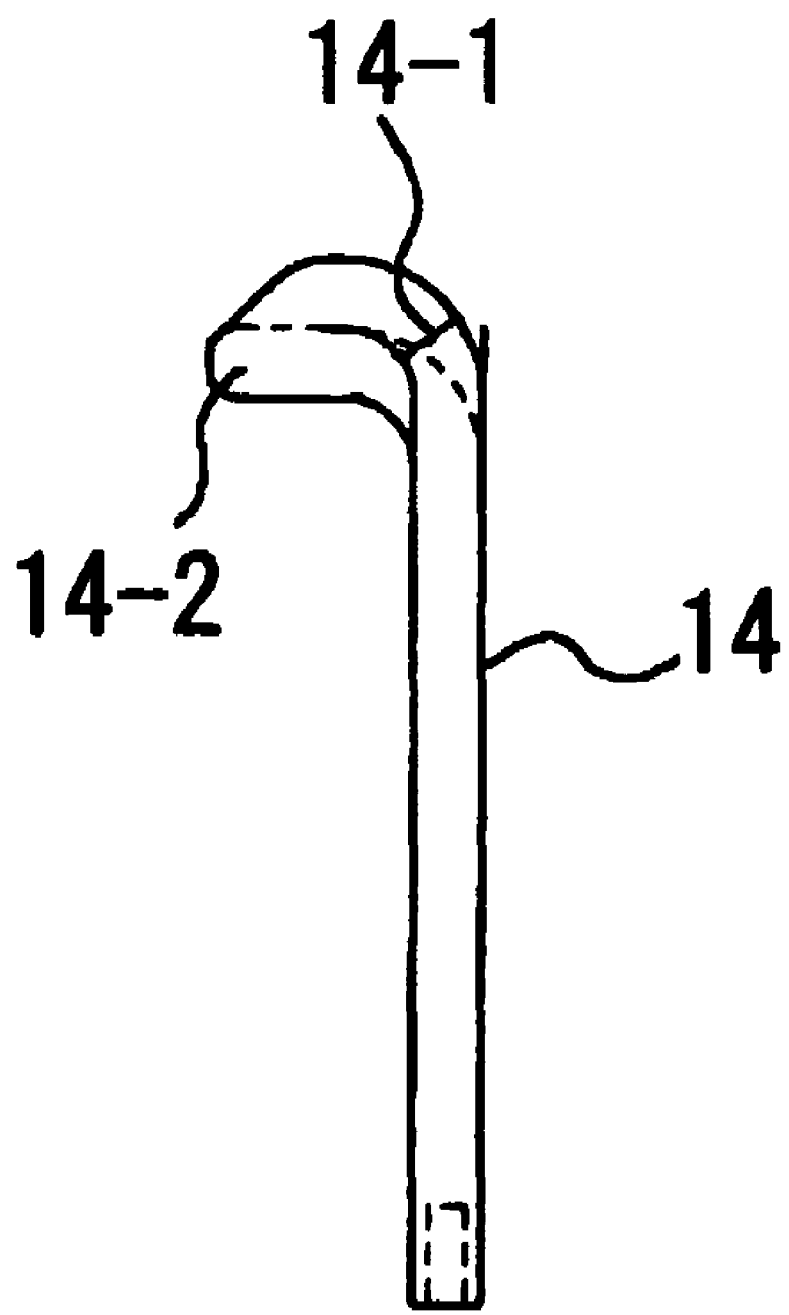
FIG. 6 shows a cross-sectional view of a front face guide of the image capturing apparatus shown in FIG. 3.
Figure 7:
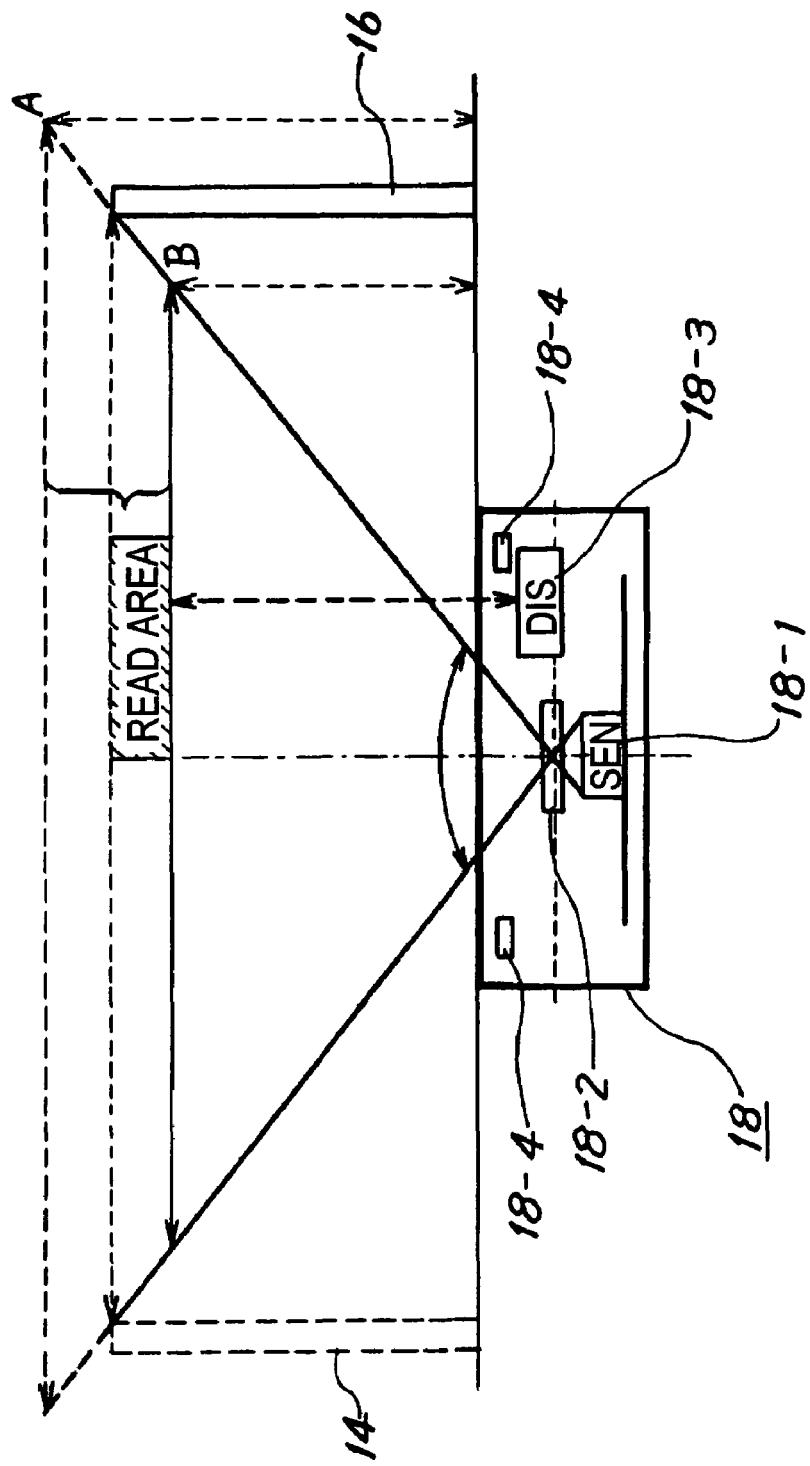
FIG. 7 shows a configuration diagram of a sensor unit of the image capturing apparatus shown in FIG. 3.
Figure 8:
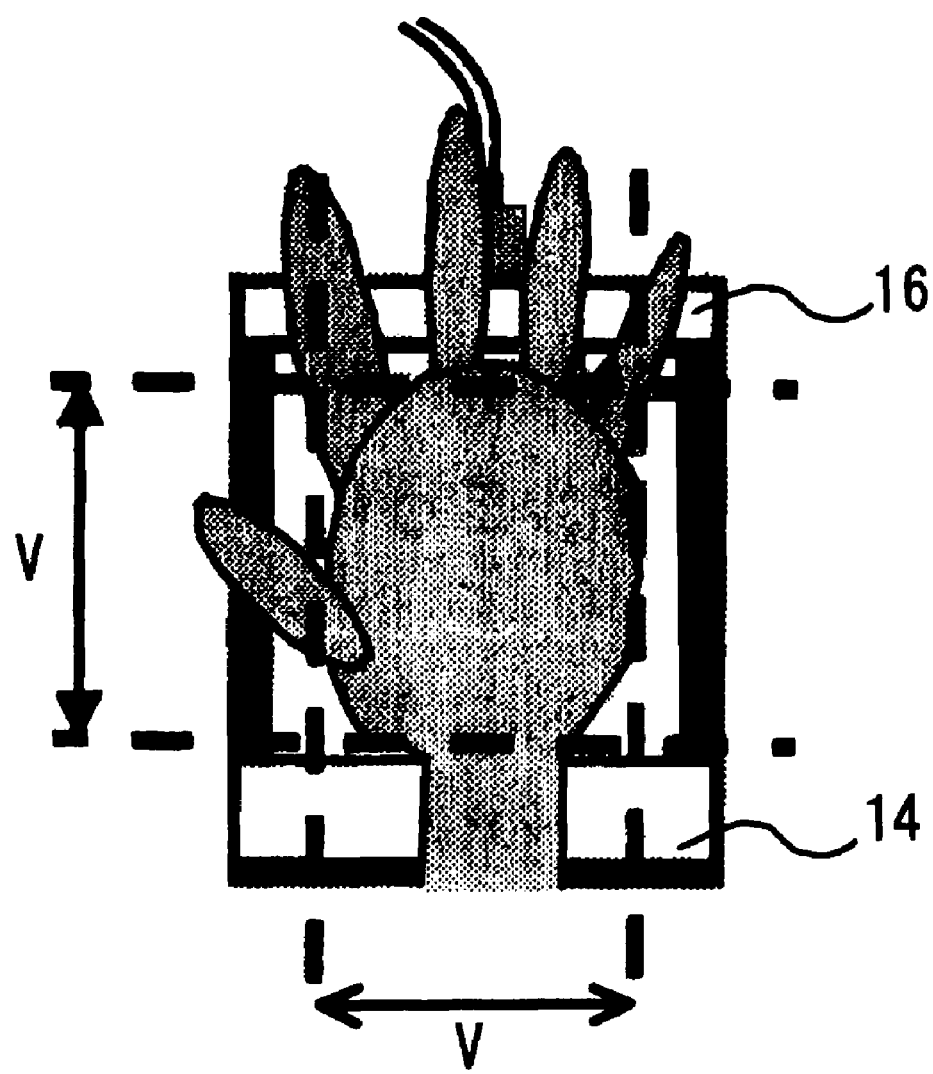
FIG. 8 shows a relation diagram between an image capturing range and the guides of the image capturing apparatus shown in FIG. 3.
Figure 9:
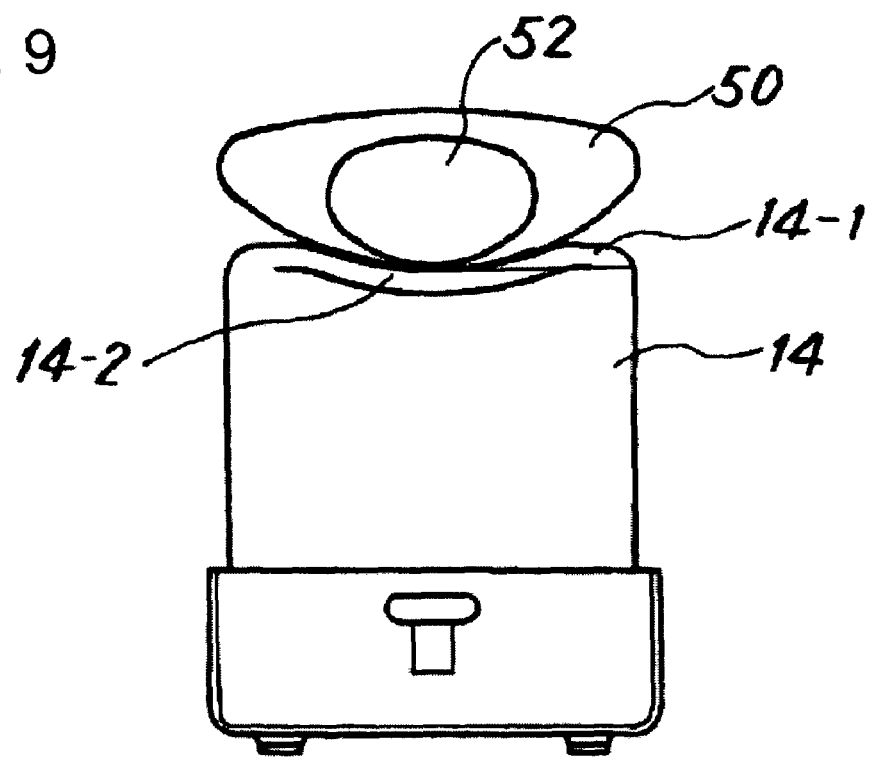
FIG. 9 shows an explanation diagram of the operation of a front face guide in the image capturing apparatus shown in FIG. 3.

Next, the image capturing apparatus 1 for palm authentication illustrated in FIG. 2 will be described in detail. FIG. 3 is a cross-sectional view of the image capturing apparatus shown in FIG. 2; FIG. 4 is a perspective view of the rear face guide 16 shown in FIG. 3; FIG. 5 is a perspective view of the front face guide 14 shown in FIG. 3; FIG. 6 is a cross-sectional view of the front face guide 14 shown in FIG. 5; FIG. 7 is a configuration diagram of the sensor unit 18 shown in FIG. 3; FIG. 8 is a relation diagram between an image capturing range of the image capturing apparatus 1 and the guides 14 and 16; and FIG. 9 is an explanation diagram of the operation of the front face guide 14.

As shown in FIG. 3, the sensor unit 18, which will be described later in FIG. 7, is mounted substantially in the center of main body 10. In the front portion (that is, on the user side) of the sensor unit 18, there are provided the front face guide 14 and the read confirmation lamp 12, which will be described later in FIGS. 5 and 6. Also, in the rear portion, the rear face guide 16, which will be described later in FIG. 4, is provided. In a lower portion of the rear face guide 16, a light emitter 20 such as an LED is provided.

As shown in FIG. 4, the rear face guide 16 is structured of a rectangular plate of a transparent, or substantially transparent, synthetic resin. The upper portion of the plate is flat, while the lower portion has a pair of insertion blocks 16-1 and 16-2. The rear face guide 16 is inserted into main body 10 as shown in FIG. 3, and the blocks 16-1 and 16-2 enable fixed positioning.

Further, as shown in FIGS. 5, 6, the front face guide 14 is structured of a transparent, or substantially transparent, synthetic resin plate. To act as both guiding of the hand on the front face and support of the wrist, the front face guide 14 has a cross-sectional shape of a vertical body, with a horizontal portion 14-1 disposed in the upper portion of front face guide 14 to support the wrist. In the center of this horizontal portion 14-1, a recess 14-2 is continuously formed, thereby enabling easier wrist positioning.

Meanwhile, as shown in FIG. 7, the sensor unit 18 includes an infrared sensor (CMOS sensor) 18-1, a condenser lens 18-2, and a plurality of near-infrared light emitters (LEDs) 18-4 which are disposed around the infrared sensor 18-1 and the condenser lens 18-2. For example, the near-infrared light emitters 18-4 are disposed in four surrounding positions, from which near infrared is emitted upward.

Further, the sensor unit 18 is provided with a distance sensor 18-3, to measure the distance to an object (palm) placed above the sensor unit 18. The measured distance is used for deciding whether the object is laid above sensor unit 18, and whether the distance to the object is appropriate. Additionally, on the upper face of the sensor unit 18, an infrared filter (not shown) is provided for eliminating the visual light.

A readable region of this sensor unit 18 is restricted by the relations among the sensor 18-1, the condenser lens 18-2 and the near-infrared emission region. In FIG. 7, a range between a height B and a height A from the sensor unit 18 corresponds to the readable region.

Accordingly, the positions and heights of the front face guide 14 and the rear face guide 16 are set as shown in FIG. 7, so that the palm supported by both the guides 14 and 16 can be positioned within the readable region. In FIG. 7, the heights and positions of both the guides 14 and 16 are set to maintain an intermediate height between the lower limit B and the upper limit A of the readable region.

Meanwhile, as shown in FIG. 8, it is required that an image capturing region V (longitudinally and laterally) of the sensor unit 18 be set to cover the whole area of the palm. The distances from the sensor unit 18 to the front face guide 14 and the rear face guide 16, namely the positional relations therebetween, are determined to meet the above requirement.

Further, the front face guide 14 has an L-shaped wrist supporter 14-1, as shown in FIGS. 5, 6. This wrist supporter 14-1 has a continuous recess 14-2 so as to form a curve which fits the shape of a wrist 52 with a hand 50. Namely, a face is formed to support the wrist, and the face has a curve so as to fit the wrist shape. Thus, it becomes possible to regulate the position and the inclination of the wrist, and to guide and control the palm correctly to the image capturing region.

Figure 10:
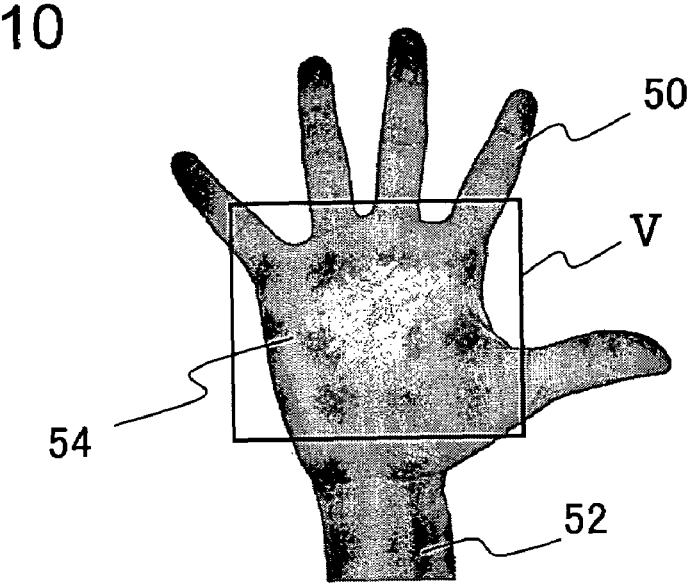
FIG. 10 shows an explanation diagram of an image capturing range for the image capturing apparatus shown in FIG. 3.

Next, the operation of the image capturing apparatus having the configurations shown in FIGS. 3 through 7 is explained hereafter, referring to FIGS. 10 through 16. When fingers of hand 50 are spread as shown in FIG. 10, palm 54 becomes flat with the maximum palm area. Accordingly, a correct vein pattern can be obtained by image capturing palm 54 placed in an image capturing region V, enabling effective registration and collation.

Figure 11:
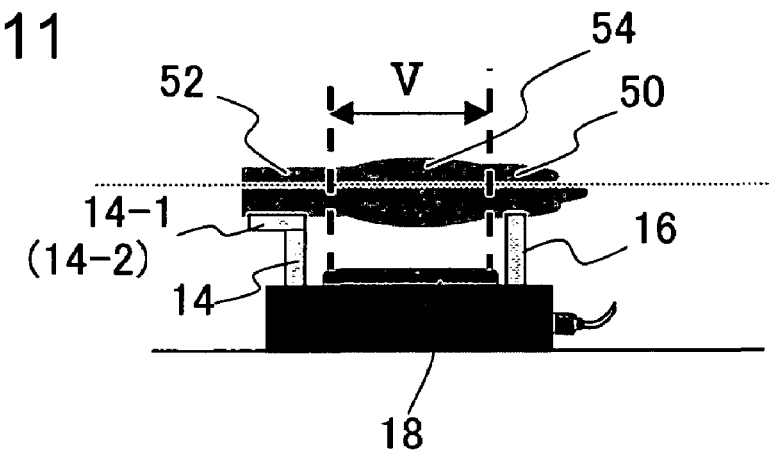
FIG. 11 shows an explanation diagram of the operation of guides in the image capturing apparatus shown in FIG. 3.

Therefore, as shown in FIG. 11, because the front face guide 14 supports the wrist 52 above the sensor unit 18, it becomes possible to guide the user's hand and support the wrist so that the palm is placed appropriately above the sensor unit 18 in the image capturing region thereof, in terms of position, inclination and height.

Also, the rear face guide 16 guides the user and supports the fingers of the hand, which becomes of help to form an optimal spread state of the fingers as shown in FIG. 10.

Figure 12:
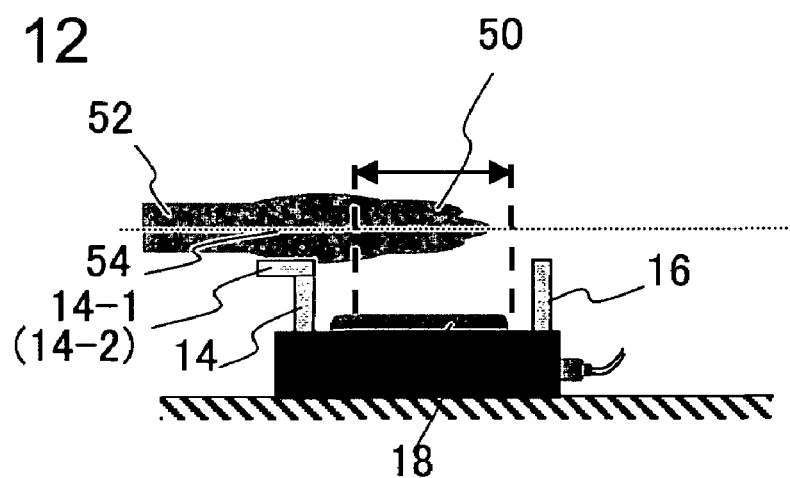
FIG. 12 shows an explanation diagram of guide operation by a front face guide of the image capturing apparatus shown in FIG. 3.

Meanwhile, as shown in FIG. 12, when the wrist 52 is not fully laid upon the wrist supporter 14-1 of the front face guide 14, only a portion of the palm is placed within the image capturing range V of sensor unit 18.

Figure 13:
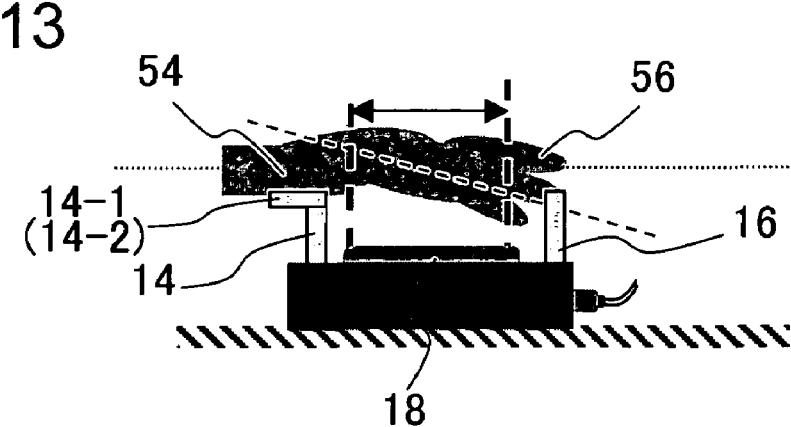
FIG. 13 shows an explanation diagram of guide operation by a front face guide and a rear face guide of the image capturing apparatus shown in FIG. 3.
Figure 14:
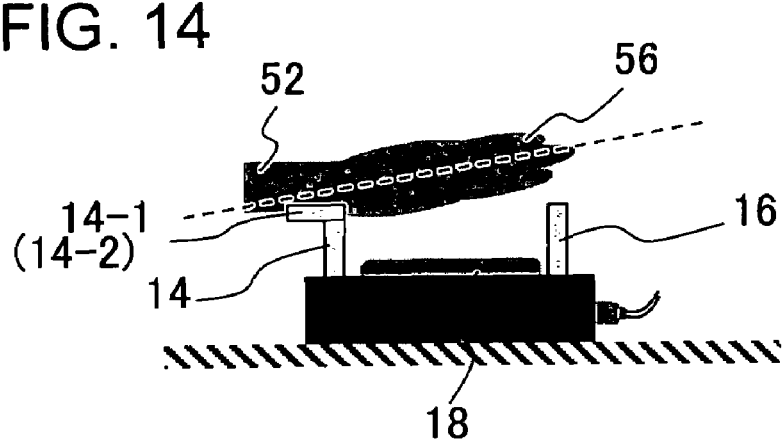
FIG. 14 shows an explanation diagram of other guide operation by a front face guide and a rear face guide of the image capturing apparatus shown in FIG. 3.

Also, as shown in FIG. 13, if neither the wrist 52 is sufficiently laid upon the wrist supporter 14-1 of the front face guide 14, nor the fingers are sufficiently laid upon the rear face guide 16, a portion of fingers 56 is not guided. As a result, an appropriate height from the sensor unit 18 is not obtained. Similarly, as shown in FIG. 14, if neither the wrist 52 is sufficiently laid upon the wrist supporter 14-1 of the front face guide 14, nor the fingers are sufficiently laid upon the rear face guide 16, the fingers may have a raised portion. As a result, an appropriate height from the sensor unit 18 is not obtained.

As such, the front face guide 14 plays the role of guiding the hand on the front face, and supporting the wrist as well, so that the palm can be guided smoothly into the image capturing range. Also, the rear face guide 16 assists the front face guide 14 and regulates the palm to be positioned in the image capturing range.

Figure 15:
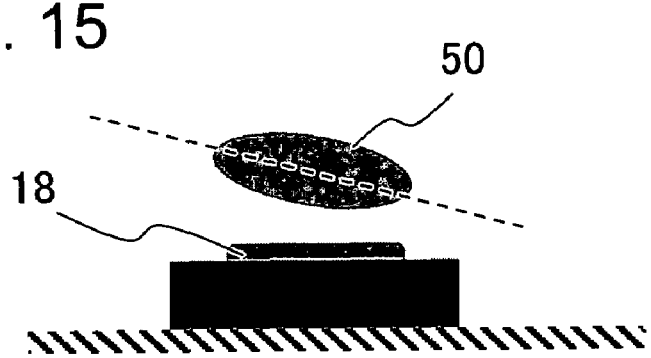
FIG. 15 shows an explanation diagram of wrist hold operation by a front face guide of the image capturing apparatus shown in FIG. 3.
Figure 16:
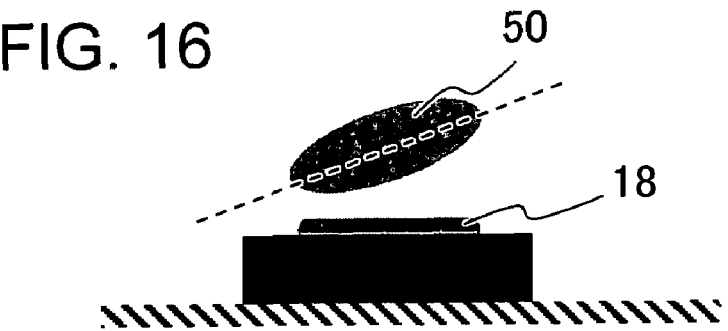
FIG. 16 shows an explanation diagram of other wrist hold operation by a front face guide of the image capturing apparatus shown in FIG. 3.

Further, when the wrist guide curve 14-2 is not provided on the front face guide 14, as shown in FIGS. 15, 16, it is not possible to guide the palm in a horizontal position in parallel with the sensor unit 18. Therefore, provision of the wrist guide curve 14-2 on the front face guide 14 is effective to prevent occurrence of such a palm state of being not horizontal.

Figure 17:
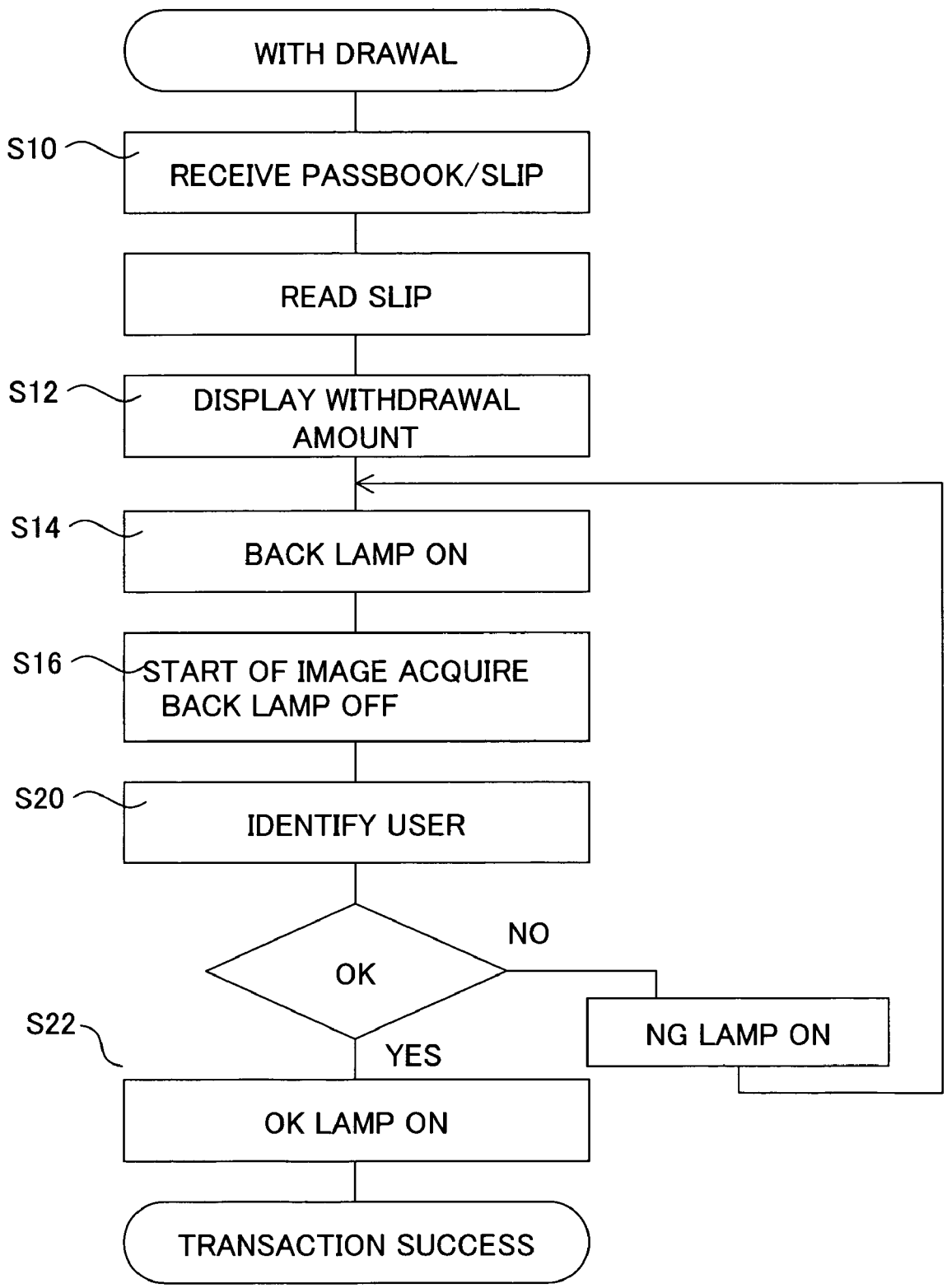
FIG. 17 shows a personal authentication process flowchart in the system shown in FIG. 1.

In the embodiment having been described, the light emitter 20 is provided on the rear face guide 16. A mode of the use of this light emitter is explained below using a withdrawal process flowchart shown in FIG. 17.

(S10) In a withdrawal job performed at the window 7 shown in FIG. 1, a teller receives a bankbook or a slip (in which transaction amount, etc. are written), and reads the slip, etc. using the window terminal 8 (OCR).

(S12) The withdrawal amount is displayed at the window terminal 8.

(S14) The light emitter (lamp) 20 on the rear face guide 16 of the image capturing apparatus 1 is turned on, and thereby a ready state for image capturing is indicated to the user.

(S16) The user places his wrist and hand on both the guides 14 and 16, and when the palm is positioned in the image capturing range of the sensor unit 18, the image capturing is started, and then the light emitter 20 is turned off.

(S20) As having been explained in the FIG. 1, the image capturing apparatus 1 reads the palm. Through the window terminal 8, the palm vein pattern is collated as vein data with the vein data having been registered in the database server 4, and the person concerned is identified accordingly.

(S22) When the personal identification using the vein data is successful, the confirmation lamp 12 displays 'confirmed' (for example, with a green light emission), and the process proceeds to the transaction processing. Meanwhile, when the above personal identification using the vein data is not successful, the confirmation lamp 12 displays 'not confirmed' (for example, with a red light emission), and the process returns to step S14 for reread process.

In such a way, using the rear face guide 16, the operation can be guided to the user.

OTHER EMBODIMENTS

Figure 18:
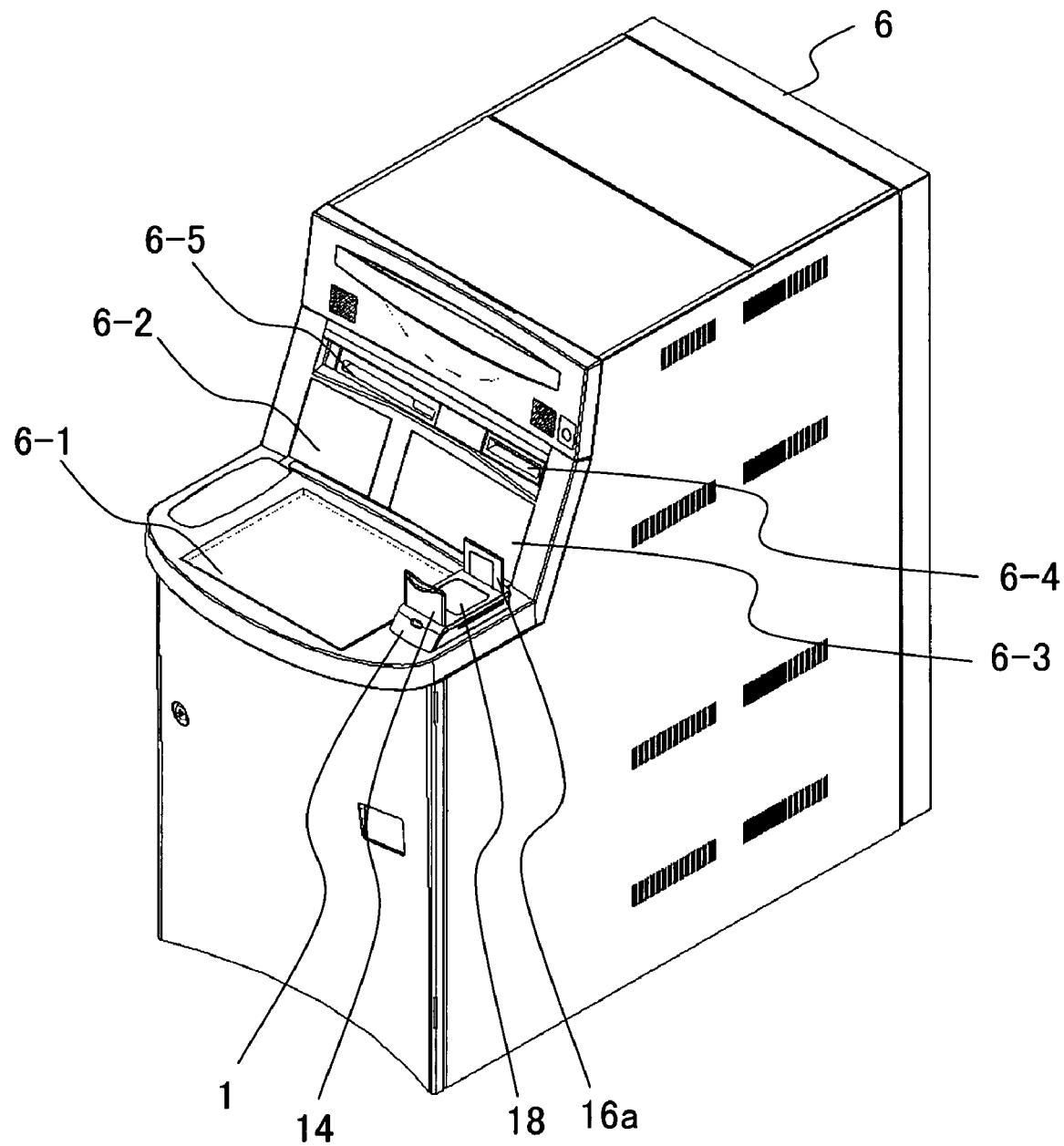
FIG. 18 shows a configuration diagram of an image capturing apparatus according to another embodiment of the present invention.

FIG. 18 is a configuration diagram of another embodiment of the present invention, which is a modified example such that the image capturing apparatus 1 is provided in the ATM 6 shown in FIG. 1. The ATM 6 includes, on the front face thereof, card inlet/outlet 6-4, bankbook inlet/outlet 6-5, currency inlet/outlet 6-3, coin inlet/outlet 6-2, and customer operation panel 6-1 for operation and display.

In this example, the image capturing apparatus 1 is disposed beside the customer operation panel 6-1. Here, if the rear face guide 16 is placed in an overlap position to the currency inlet/outlet 6-3, it may be difficult for the user to insert or release currency.

To avoid this problem, the rear face guide 16a is structured to be rotatable around an axis, so as to be folded down on the sensor unit 18 side. When the user uses the image capturing apparatus 1, the rear face guide 16a is raised up either automatically or by a manual operation of the user, and the image capturing is performed in a state shown in FIG. 2. After the personal identification is completed, the rear face guide 16a is folded down on the sensor unit 18 side either automatically or by a manual operation of the user. With this, it becomes possible to avoid the rear face guide 16a from impeding insertion or extraction of the currency, which may otherwise by caused by the structure of the rear face guide 16a overlapping with the currency inlet/outlet 6-3.

Figure 19:
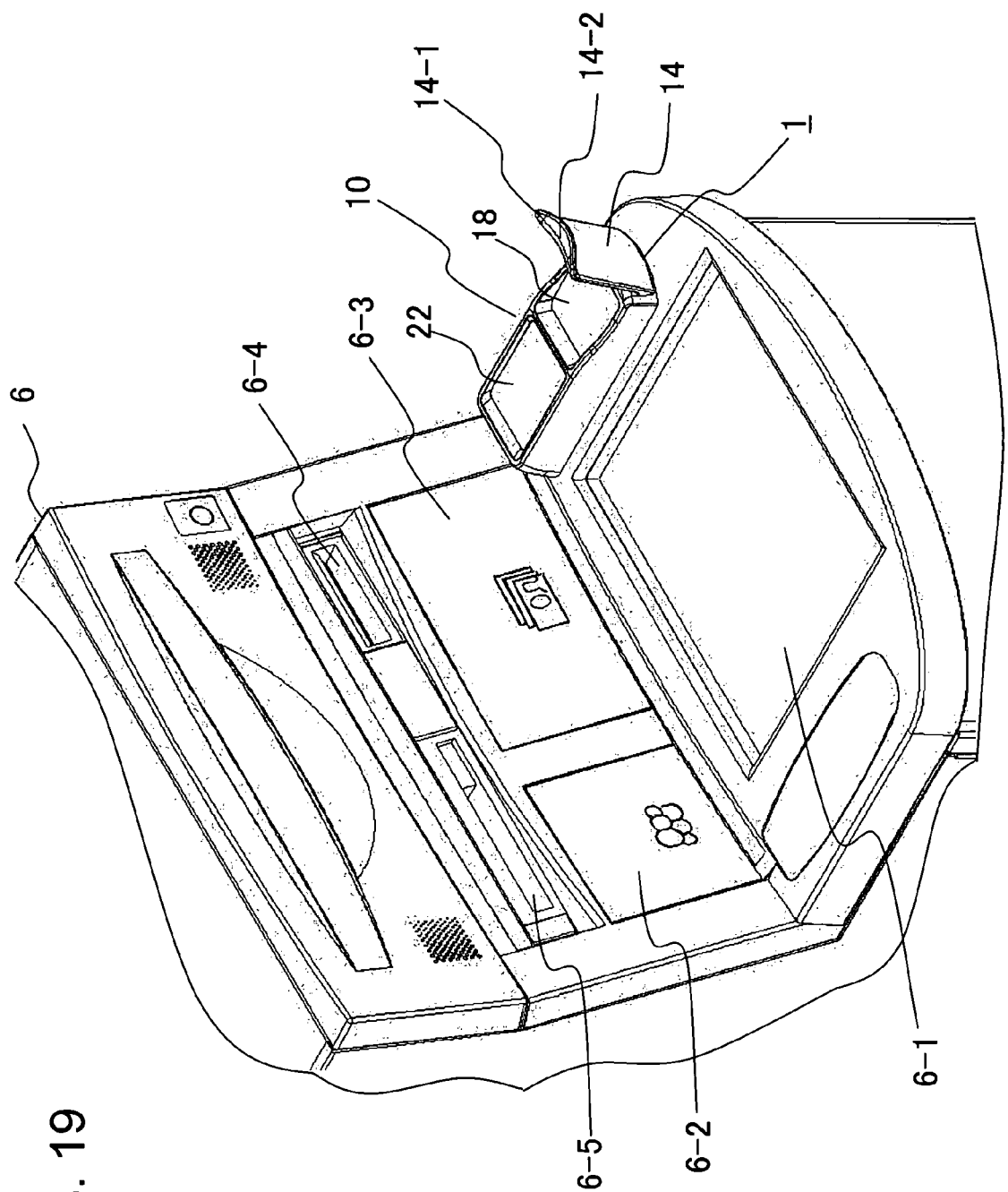
FIG. 19 shows a configuration diagram of an image capturing apparatus according to the other embodiment of the present invention.

FIG. 19 shows a perspective view of the image capturing apparatus according to still another embodiment of the present invention. In FIG. 19, like parts shown in FIGS. 2 through 7 refer to like numerals. In this example, the rear face guide 16 is not provided. Namely, on the front portion of main body 10, the sensor unit 18 having been illustrated in FIG. 7 is mounted. On the front portion (user side) of the sensor unit 18, the front face guide 14 is provided.

As shown in FIGS. 5 and 6, the front face guide 14 is structured of a transparent, or substantially transparent, synthetic resin plate. To fill the roles of both guiding the hand on the front face and supporting the wrist, the front face guide 14 has a cross-sectional shape of a vertical body and a horizontal portion 14-1 in the upper portion of the front face guide 14, so as to support the wrist. In the center of this horizontal portion 14-1, a recess 14-2 is continuously formed, thus enabling easier wrist positioning.

Further, in the rear portion of the sensor unit 18 of the main body 10, a flat portion 22 is provided. An operation mechanism such as a ten key is mounted on this flat portion 22.

With such a structure, the function and the effect of the front face guide 14 are the same as the foregoing embodiments. Namely, the front face guide 14 plays the roles of guiding the hand on the front face, and supporting and positioning the wrist.

In the above embodiments, palm authentication has been explained using vein pattern authentication of the palm. However, the present invention is also applicable to other authentication method in which other palm features, such as palm pattern, are utilized for authentication. Also, although the above description has been exemplified by the financial service application, it is possible to apply the apparatus of the present invention to other jobs which require personal authentication.

In addition, the front face guide 14 may be of other accommodation structures such as fold type. As to the sensor unit, it is not limited to the near-infrared sensor unit, but other sensor units may be applicable. In the foregoing description, the light emitter 20 is provided on the rear face guide 16. However, no provision of light emitter 20 may also be possible.

To summarize the effect of the present invention, because a front face guide is provided on one side of a non-contact sensor unit to support a wrist with a hand to be imaged, it is possible to guide a palm naturally to the image capturing range of the sensor unit when image capturing the palm for personal authentication. Also, supporting the wrist enables the palm to be positioned within the image capturing range correctly. Thus, it is possible to image the palm for palm authentication in a short time without causing troubles to the user, and to reduce a palm authentication time as well. Thus, it will contribute to diffusion of palm authentication apparatuses.

The foregoing description of the embodiments is not intended to limit the invention to the particular details of the examples illustrated. All features and advantages of the invention which fall within the scope of the invention are covered by the appended claims.

What is claimed is:

1. An image capturing apparatus for palm authentication for image capturing an authentication pattern from a palm, comprising:
   a non-contact sensor unit which irradiates light to the palm, receives reflected light to capture images of the palm;
   a front face guide disposed on one side of the non-contact sensor unit, and having an upper portion for putting on a wrist with a hand to be captured by the non-contact sensor unit; and
   a rear face guide disposed on the other side of the non-contact sensor unit, and having an upper portion for putting on fingers of the hand,
   wherein said front face guide and said rear face guide are disposed at an interval which positions the palm, which is supported by the wrist with said front face guide and the fingers with said rear face guide, in an image capturing region of the non-contact sensor unit,
   and the front face guide comprises:
   an upright portion that has a height from the non-contact sensor unit as to position the palm in a reading region of the non-contact sensor unit; and
   said upper portion provided on the upright portion.

2. The image capturing apparatus for palm authentication according to claim 1,
   wherein the front face guide is disposed in such a horizontal position from the non-contact sensor unit as to put on the wrist and to position the palm in an image capturing region of the non-contact sensor unit.

3. The image capturing apparatus for palm authentication according to claim 1,
   wherein the front face guide includes said upper portion having a portion formed along the wrist.

4. The image capturing apparatus for palm authentication according to claim 3,
   wherein said upper portion includes a curved wrist-support portion having a plane contact to the wrist.

5. The image capturing apparatus for palm authentication according to claim 1,
   wherein the rear face guide is disposed in such a horizontal position from the non-contact sensor unit as to put on the fingers of the hand and to position the palm in an image capturing region of the non-contact sensor unit.

6. The image capturing apparatus for palm authentication according to claim 1,
   wherein the rear face guide comprises:
   a second upright portion that has a height from the non-contact sensor unit as to put on the fingers of the hand and to position the palm in an image capturing region of the non-contact sensor unit; and
   said upper portion provided on the second upright portion.

7. The image capturing apparatus for palm authentication according to claim 1,
   wherein the front face guide is a virtually L-shaped guide having an upright portion and a horizontal portion for putting on the wrist.

8. The image capturing apparatus for palm authentication according to claim 1,
   wherein the front face guide comprises a transparent member or a substantially transparent member.

9. The image capturing apparatus for palm authentication according to claim 1,
   wherein the non-contact sensor unit further comprises a sensor unit, which irradiates near infrared light to the palm, receives reflected light from the palm, and detects a vein pattern of the palm.

10. The image capturing apparatus for palm authentication according to claim 1,
    wherein the non-contact sensor unit comprises:
    a light emitter for irradiating near infrared light to the palm; and
    a photo-detector for receiving reflected light from the palm,
    and wherein a reading region of the non-contact sensor is determined from the performance of the light emitter and the photodetector.

11. The image capturing apparatus for palm authentication according to claim 1,
    wherein the rear face guide comprises a transparent member or a substantially transparent member.

12. An image capturing apparatus for palm authentication for image capturing an authentication pattern from a palm, comprising:
    a non-contact sensor unit which irradiates light to the palm, receives reflected light to capture images of the palm;
    a front face guide disposed on one side of the non-contact sensor unit, for supporting a wrist with a hand to be captured by the non-contact sensor unit;
    a rear face guide disposed on the other side of the non-contact sensor unit, for supporting fingers of the hand; and
    a light emitter which is selectively driven so as to change guidance colors of the rear face guide,
    wherein the rear face guide comprises a transparent member or a substantially transparent member.

13. The image capturing apparatus for palm authentication according to claim 1,
    wherein the rear face guide is structured to be rotatable around an axis.

14. The image capturing apparatus for palm authentication according to claim 1,
    wherein the upper portion of said front face guide comprises a curved shaped face in a vertical direction.

15. The image capturing apparatus for palm authentication according to claim 1,
    wherein the upper portion of said front face guide comprises a curved shaped face in a horizontal direction.

* * * * *

UNITED STATES PATENT AND TRADEMARK OFFICE
CERTIFICATE OF CORRECTION

PATENT NO.        : 7,580,552 B2
APPLICATION NO.   : 11/063611
DATED             : August 25, 2009
INVENTOR(S)       : Yoshizu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Fourteenth Day of September, 2010

David J. Kappos
*Director of the United States Patent and Trademark Office*